United States Patent Office 2,979,515
Patented Apr. 11, 1961

2,979,515
HETEROCYCLIC DYESTUFF INTERMEDIATES

David I. Randall, Mount Vernon, N.Y., and Wilhelm Schmidt-Nickels, Little York, N.J., assignors to General Aniline & Film Corporation, New York, N.Y., a corporation of Delaware No Drawing. Filed Nov. 17, 1958, Ser. No. 774,142

7 Claims. (Cl. 260—346.2)

This invention relates to novel heterocyclic dyestuff intermediates having the formula

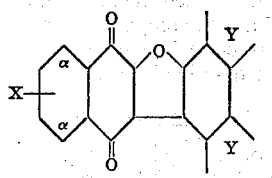

wherein one adjacent pair of Y valences are bonded to hydrogen atoms, the other adjacent pair of Y valances are bonded to a radical consisting of those of the formulae (a)

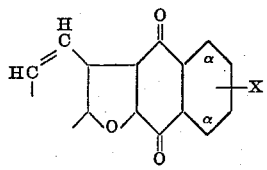

and (b)

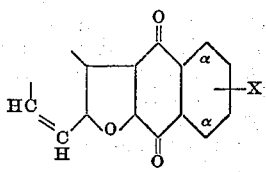

and X is selected from the group consisting of $NO_2$ and $NH_2$ and is bonded in one of the $\alpha$ positions.

The provision of the above-described intermediates, and methods for their production constitute the objects and purposes of the instant invention.

The compounds of the instant invention may be prepared by reacting 2 moles of 8-nitro-2,3-dichloro-1,4-naphthoquinone with 1 mole of a dihydroxynaphthalene such as 1,5-dihydroxynaphthalene or 2,6-dihydroxynaphthalene, in the presence of an alkaline acid binding agent. It will be noted that the naphthol reactant must have one of the positions ortho to each of the OH groups unsubstituted. Compounds of the instant invention in which X is $NH_2$ may be obtained by subjecting the nitro product of the above reaction to alkaline reduction in known manner, as for example by treatment with alkaline sodium hydrosulfide or hydrosulfite. The resulting amino compound is obtained in its leuco form, which may be converted to the keto form in the usual manner by oxidation, as for example by treatment with air or the like. It will of course be understood that substituents inert to the desired reaction and to the desired use of the instant compounds may be present in the dyestuff intermediates of the instant invention.

The preferred alkaline acid binding agent for use in the process of the instant invention is pyridine, although other similar organic tertiary amine bases may be employed such as tripropylamine, dimethylcyclohexylamine, N-methyl morpholine, the lower alkylated pyridines, and the like. The alkaline acid binding agent preferably acts simultaneously as a diluent for the reaction, which is carried out at elevated temperatures, conveniently at the boil.

In the above reaction, one of the hydroxy groups of the naphthol compound reacts with one of the chlorine atoms in the naphthoquinone compound to split off hydrogen chloride and the other chlorine atom in the naphthoquinone compound reacts with the free hydrogen atom ortho to the said hydroxy group to split off another hydrogen chloride group. A similar reaction also occurs between the other hydroxy group in the naphthol compound and another naphthoquinone compound. Since the directive influence of the nitro group in the naphthoquinone compound is not absolute, the reaction inherently produces a mixture of isomeric compounds due to competition between the two chlorine atoms in each naphthoquinone reacting molecule for reaction with each hydroxy group or unsubstituted position adjacent thereto in the naphthol reactant. One of such isomeric compounds may be formed by reaction of the 3-chlorine atoms (in trans position relative to the nitro group in the 8-nitro-2,3-dichloro-1,4-naphthoquinone reactant) in each of 2 molecules of such reactant with the hydroxy groups in the naphthol reactant mo'ecule. Another such isomeric compound may be formed by similar reaction of the 2-chlorine atoms (in cis position relative to the nitro group) in each of 2 molecules of the naphthoquinone reactant with the hydroxy groups in the naphthol reactant molecule. A third isomeric compound may be formed by reaction of the 3-chloro atom in one naphthoquinone reactant molecule with one hydroxy group of the naphthol reactant molecule and the 2-chlorine atom in another molecule of naphthoquinone reactant with the other hydroxy group in the naphthol reactant molecule. For example, the following isomers may be produced by reaction between 2 moles of 8-nitro-2,3-dichloro-1,4-naphthoquinone with one mole of 1,5-dihydroxynaphthalene as in Example 1 below.

(I)

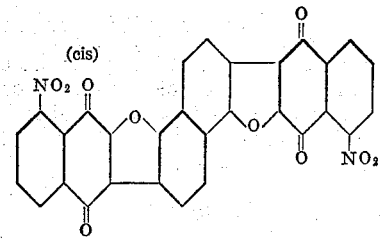

(II)

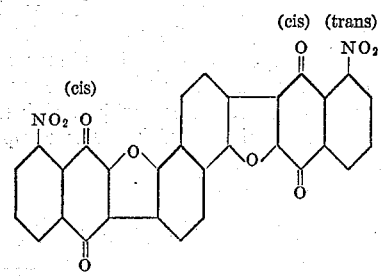

(III)

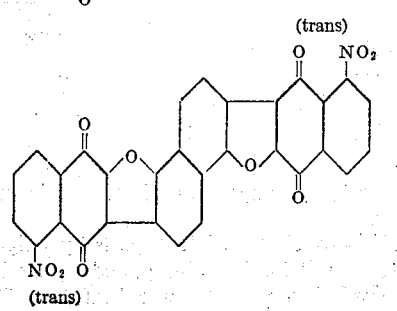

The exact proportion of isomers produced in any single reaction is not known, but such isomers may, if desired, be separated from the mixtures in which they are produced by various means commonly employed by workers skilled in the art. Illustratively, one or more of the following known methods of separation of closely related or isomer compounds may be employed:

(1) Fractional precipitation from solutions in concentrated sulfuric acid, this method being dependent upon the different solubilities of the isomers in such solutions. This method may be employed to separate the nitro-containing isomers from each other as well as the amino-containing isomers.

(2) Fractional crystallization from solutions in a hot organic solvent such as dichlorobenzene or the like, each isomer being crystallized out and easily separated as the solution is allowed to cool.

(3) Vacuum sublimation (fractional).

(4) Fractional crystallization of the acetylamino derivatives followed by hydrolysis of the separated compounds to regenerate the free amino groups.

(5) Chromatographic adsorption.

The corresponding amino compounds may be produced by reduction of the above mentioned isomeric nitro compounds, and reduction of the mixtures of isomers produced by the above described reactions will yield mixtures of the corresponding amino-containing isomers.

The compounds of the instant invention, particularly those compounds wherein X is $NH_2$, or the isomeric mixtures of such compounds, may serve as intermediates in the production of novel vat dyestuffs, for example by reaction with an acylating agent such as benzoyl chloride, terephthaloyl chloride and the like as disclosed and claimed in our copending application Serial No. 556,414, now U.S. Patent No. 2,870,168, with halo substituted vattable polycyclic ketones such as dibenzopyrenequinone, anthanthrone, pyranthrone, violanthrone, and the like, as disclosed and claimed in our copending application Serial No. 556,415, now U.S. Patent No. 2,862,931, or with halo derivatives of anthraquinones having one position ortho to each halo substituent unsubstituted, followed by carbazole ring-closure as disclosed and claimed in our copending application Serial No. 556,473, now U.S. Patent No. 2,813,875, all filed on December 30, 1955.

The following examples, in which parts are by weight unless otherwise indicated, are illustrative of the instant invention and are not to be regarded as limitative. Unless otherwise indicated, parts by weight are in grams, and parts by volume are in cc.

*Example 1*

A charge of 75 parts by volume pyridine, 3.2 parts by weight 1,5-dihydroxynaphthalene and 10.9 parts by weight 8-nitro-2,3-dichloro-1,4-naphthoquinone was stirred at reflux for 6 hours. The reaction product was filtered off at room temperature, washed with pyridine, acetone and dried. It was a mixture of isomeric compounds of the formula

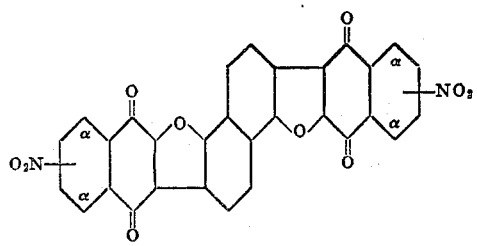

in which the $NO_2$ groups are each bonded in one of the α positions.

*Reduction.*—A charge of 1500 parts by weight of 2% aqueous sodium hydroxide solution and 6 parts by weight of the above nitro products was heated at 70° C. at which temperature 24 parts by weight sodium hydrosulfite was added. Stirring was continued at 70° C. for ½ hour. Then air was blown through the solution while allowing it to cool to room temperature. The mixture of corresponding precipitated amino compounds of the formula

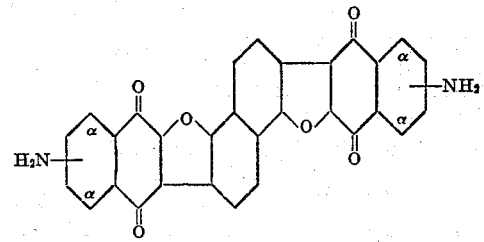

was filtered off, washed neutral and dried. The isomeric nitro and amino compounds may be separated from each other by fractional precipitation from concentrated sulfuric acid as described above.

*Example 2*

The process of Example 1 is repeated, but substituting an equal amount of 2,6-dihydroxynaphthalene for the 1,5-dihydroxynaphthalene. The initial mixture of isomeric compounds has the formula

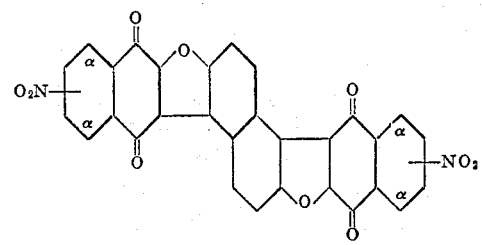

in which the $NO_2$ groups are each bonded in one of the α positions. When this mixture is reduced as described in Example 1, a mixture of the corresponding amino compounds is obtained which may be similarly recovered and separated by fractional precipitation.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

This application is a continuation-in-part of our copending application Serial No. 556,395, filed on December 30, 1955, now abandoned.

We claim:

1. Compounds having the formula

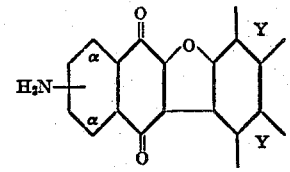

wherein one adjacent pair of Y valences are attached to hydrogen atoms, the other adjacent pair of Y valences are bonded to a radical selected from the group consisting of those of the formulae (a)

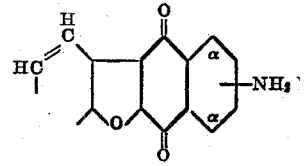

and (b)

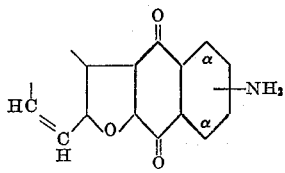

and wherein the —NH₂ group is bonded in one of the α positions.

2. A compound having the formula

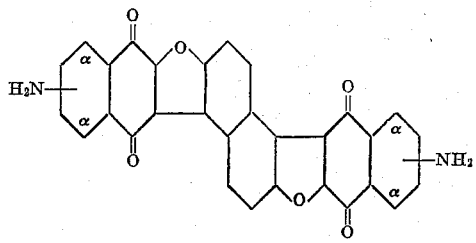

wherein the NH₂ groups are each bonded in one of the α positions.

3. A compound of the formula

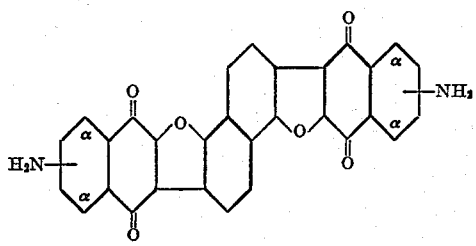

wherein the NH₂ groups are each bonded in one of the α positions.

4. A process comprising reacting by heating 2 moles of 8-nitro-2,3-dichloro-1,4-naphthoquinone with 1 mole of a member of the group consisting of 1,5-dihydroxynaphthalene and 2,6-dihydroxynaphthalene in the presence of an alkaline acid binding agent, followed by the step of reducing the nitro groups in the resulting product to amino groups by treatment with an alkaline reducing agent.

5. A process as defined in claim 4 wherein said acid binding agent is pyridine.

6. A process comprising reacting by heating 2 moles of 8-nitro-2,3-dichloro-1,4-naphthoquinone with 1 mole of 1,5-dihydroxynaphthalene in the presence of pyridine followed by the step of reducing the nitro groups in the resulting product to amino groups by treatment with sodium hydrosulfite.

7. A process comprising reacting by heating 2 moles of 8-nitro-2,3-dichloro-1,4-naphthoquinone with 1 mole of 2,6-dihydroxynaphthalene in the presence of pyridine, followed by the step of reducing the nitro groups in the resulting product to amino groups by treatment with sodium hydrosulfite.

References Cited in the file of this patent

FOREIGN PATENTS 300,407  Great Britain _____ Nov. 15, 1928

OTHER REFERENCES

Whitmore et al.: Organic Chemistry, second edition, p. 169 (1951).